(12) United States Patent
Chin et al.

(10) Patent No.: US 9,042,215 B2
(45) Date of Patent: May 26, 2015

(54) SIMULTANEOUS ACQUISITION OF A TD-SCDMA NETWORK IN CIRCUIT-SWITCHED FALLBACK FROM TDD-LTE SYSTEMS

(75) Inventors: Tom Chin, San Diego, CA (US); Guangming Shi, San Diego, CA (US); Kuo-Chun Lee, San Diego, CA (US); Thawatt Gopal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 13/224,039

(22) Filed: Sep. 1, 2011

(65) Prior Publication Data

US 2012/0257494 A1    Oct. 11, 2012

Related U.S. Application Data

(60) Provisional application No. 61/472,090, filed on Apr. 5, 2011.

(51) Int. Cl.
*H04W 36/00* (2009.01)
*H04W 76/02* (2009.01)

(52) U.S. Cl.
CPC ........ *H04W 36/0027* (2013.01); *H04W 76/026* (2013.01)

(58) Field of Classification Search
None
See application file for complete search history.

(56) References Cited

U.S. PATENT DOCUMENTS

| | | | |
|---|---|---|---|
| 8,391,241 B2* | 3/2013 | Vikberg et al. | 370/331 |
| 2010/0234026 A1* | 9/2010 | Tenny et al. | 455/436 |
| 2010/0273490 A1* | 10/2010 | Velde et al. | 455/436 |
| 2011/0014919 A1 | 1/2011 | Otte et al. | |
| 2012/0064884 A1* | 3/2012 | Ramachandran et al. | 455/422.1 |
| 2012/0224563 A1* | 9/2012 | Zisimopoulos et al. | 370/331 |
| 2012/0307735 A1* | 12/2012 | Aghili et al. | 370/328 |

OTHER PUBLICATIONS

"Digital cellular telecommunications system (Phase 2+); Universal Mobile Telecommunications System (UMTS); LTE; Circuit Switched (CS) fallback in Evolved Packet System (EPS); Stage 2 (3GPP TS 23.272 version 8.4.0 Release 8)", Technical Specification, European Telecommunications Standards Institute (ETSI), 650, Route Des Lucioles; F-06921 Sophia-Antipolis; France, No. V8.4.0, Jun. 1, 2009, XP014044533.
International Search Report and Written Opinion—PCT/US2011/053533—ISA/EPO—Dec. 13, 2011.

* cited by examiner

*Primary Examiner* — Chirag Shah
*Assistant Examiner* — Srinivasa Reddivalam
(74) *Attorney, Agent, or Firm* — Kristine U. Ekwueme

(57) ABSTRACT

In mobile user equipment (UE) configured to allow for operation on multiple wireless communication networks, such as on a TD-SCDMA network or on a TDD-LTE network, an improved method for handing over a circuit-switched call is offered. The proposed circuit-witched fallback procedure, employing an improved UE hardware architecture, allows for certain connection setup procedures to occur in parallel, such as the UE pre-acquiring the TD-SCDMA cell. The parallel operations thus speed up the circuit-switched fallback procedure and reduce existing delays in executing circuit-switched fallback from TDD-LTE to TD-SCDMA networks.

12 Claims, 10 Drawing Sheets

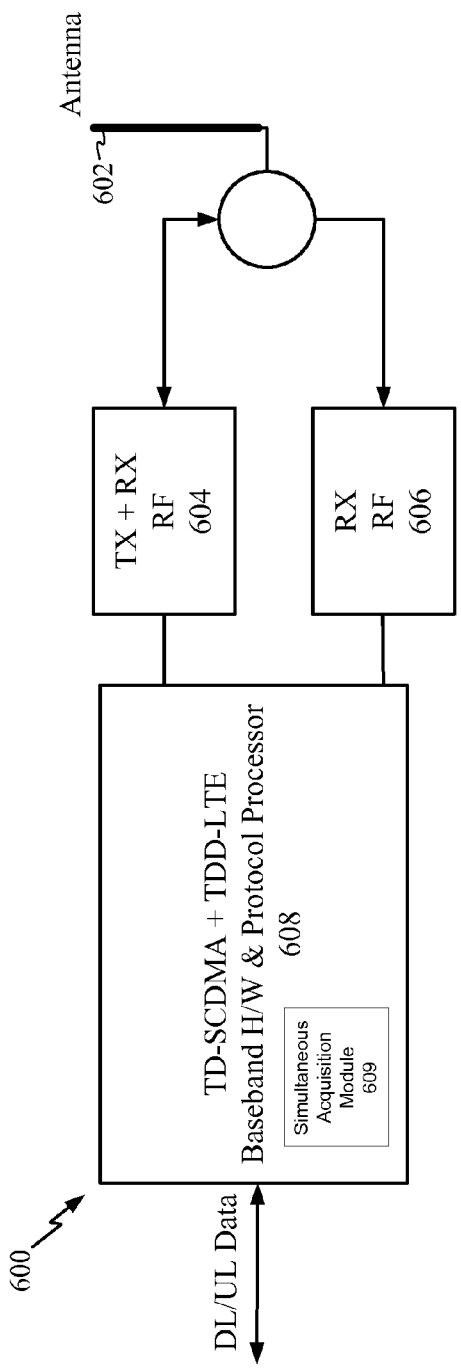
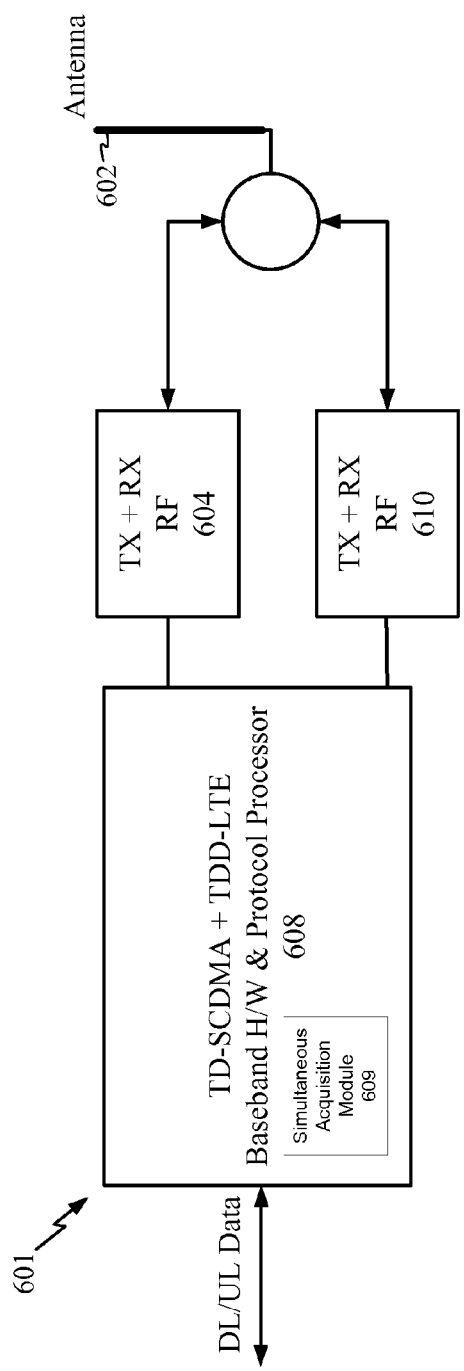
FIG. 6A
FIG. 6B

SIMULTANEOUS ACQUISITION OF A TD-SCDMA NETWORK IN CIRCUIT-SWITCHED FALLBACK FROM TDD-LTE SYSTEMS

CROSS REFERENCE TO RELATED APPLICATION

This application claims the benefit of U.S. provisional patent application No. 61/472,090 filed Apr. 5, 2011, in the names of CHIN et al., the disclosure of which is expressly incorporated herein by reference in its entirety.

BACKGROUND

1. Field

Aspects of the present disclosure relate generally to wireless communication systems, and more particularly, to an improved method of acquiring a TD-SCDMA network during a circuit-switched fallback procedure from a TDD-LTE system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

BRIEF DESCRIPTION OF THE DRAWINGS

FIG. 6A is a block diagram illustrating a dual mode UE for implementing one aspect of the present disclosure.

FIG. 6B is a block diagram illustrating another dual mode UE for implementing one aspect of the present disclosure.

SUMMARY

Figure 1:
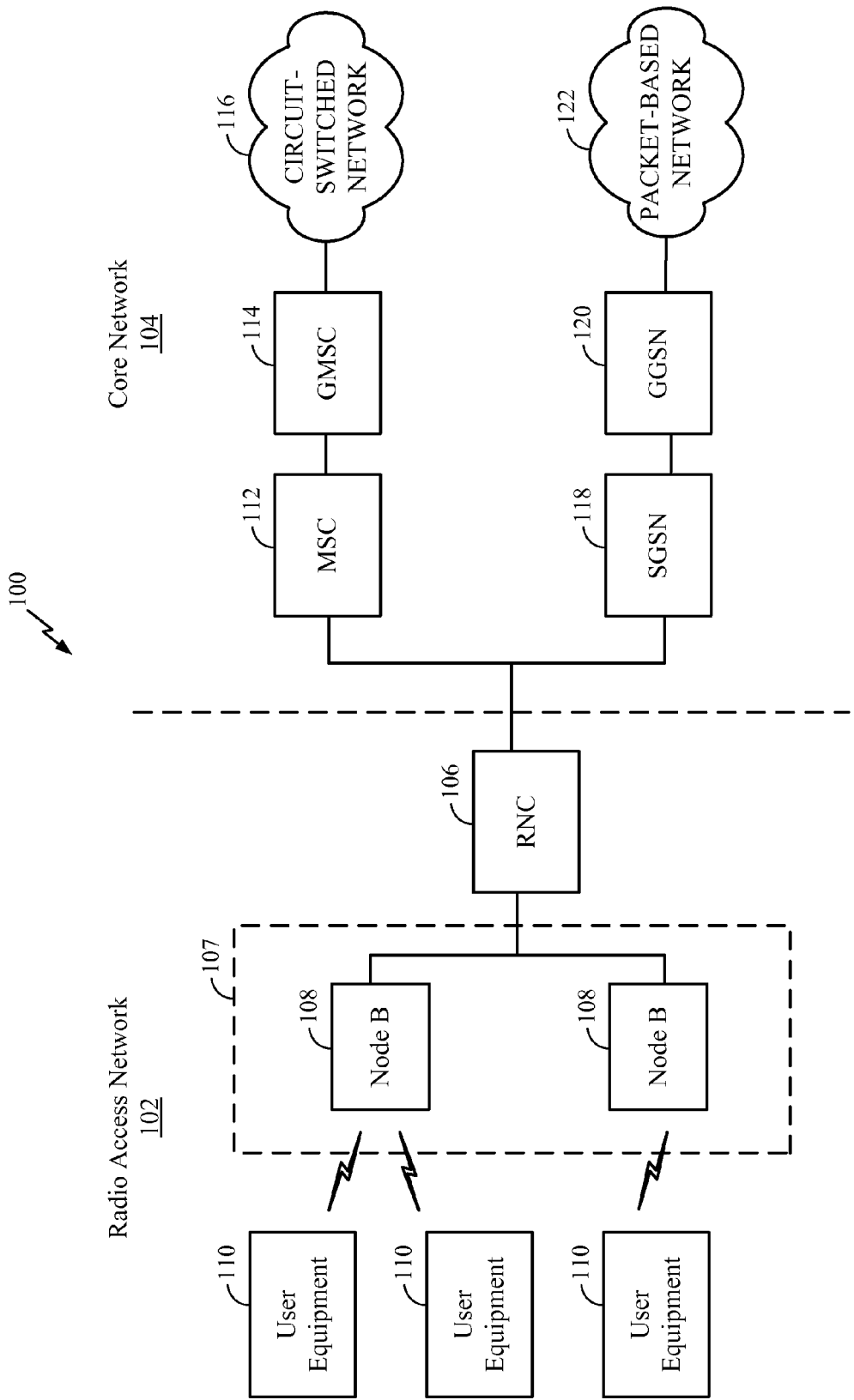
FIG. 1 is a block diagram conceptually illustrating an example of a telecommunications system.

Offered is a method for wireless communication. The method includes communicating with a first radio access network to obtain information relating to a circuit switched fall back to a second radio access network. The method also includes initiating communications with the second radio access network during the communicating.

Offered is a user equipment configured for wireless communication. The user equipment includes means for communicating with a first radio access network to obtain information relating to a circuit switched fall back to a second radio access network. The user equipment also includes means for initiating communications with the second radio access network during the communicating.

Offered is a computer program product including a non-transitory computer-readable medium having program code recorded thereon. The program code includes program code to communicate with a first radio access network to obtain information relating to a circuit switched fall back to a second radio access network. The program code also includes program code to initiate communications with the second radio access network during the communicating.

Offered is a user equipment configured for wireless communication. The user equipment includes a processor(s) and a memory coupled to the processor(s). The processor(s) is configured to communicate with a first radio access network to obtain information relating to a circuit switched fall back to a second radio access network. The processor(s) is also configured to initiate communications with the second radio access network during the communicating.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
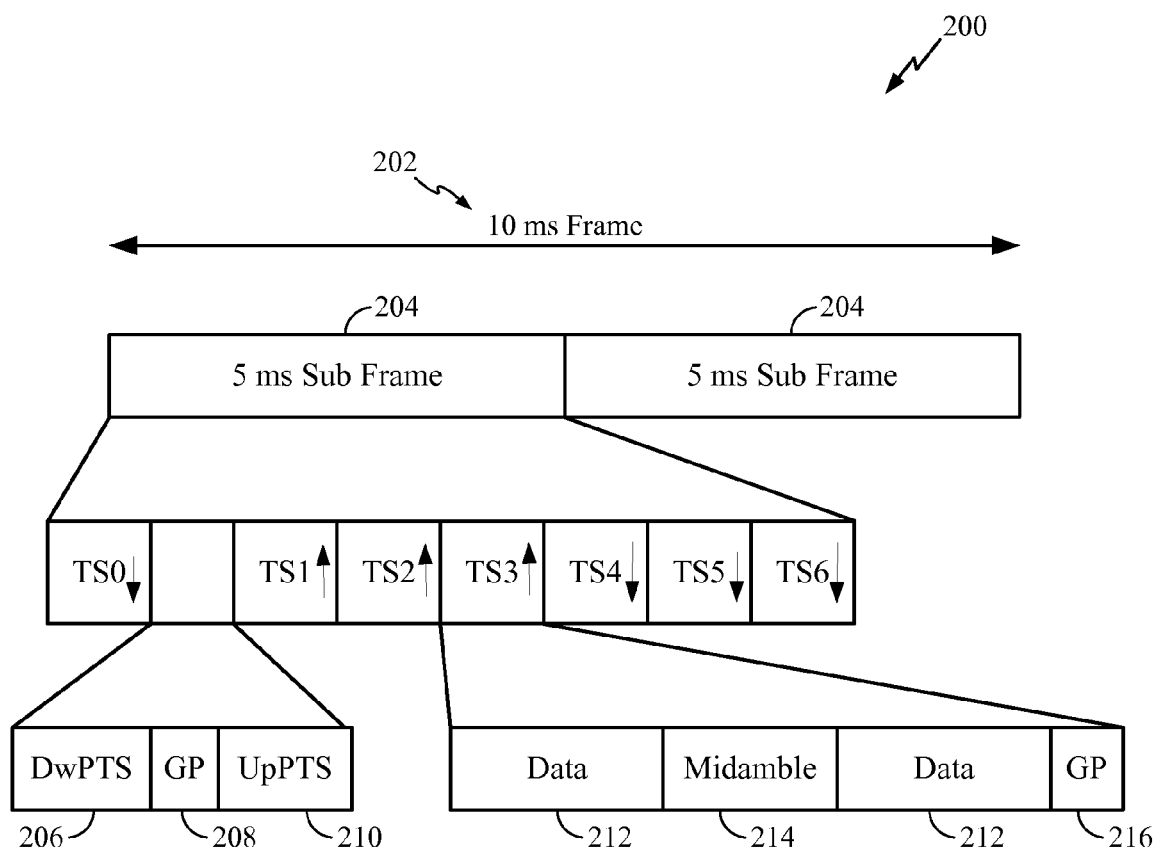
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. In the example illustrated, TS1-TS3 are allocated for uplink and TS4-TS6 are allocated for downlink. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference. The chip rate in TD-SCDMA is 1.28 Mcps.

Figure 3:
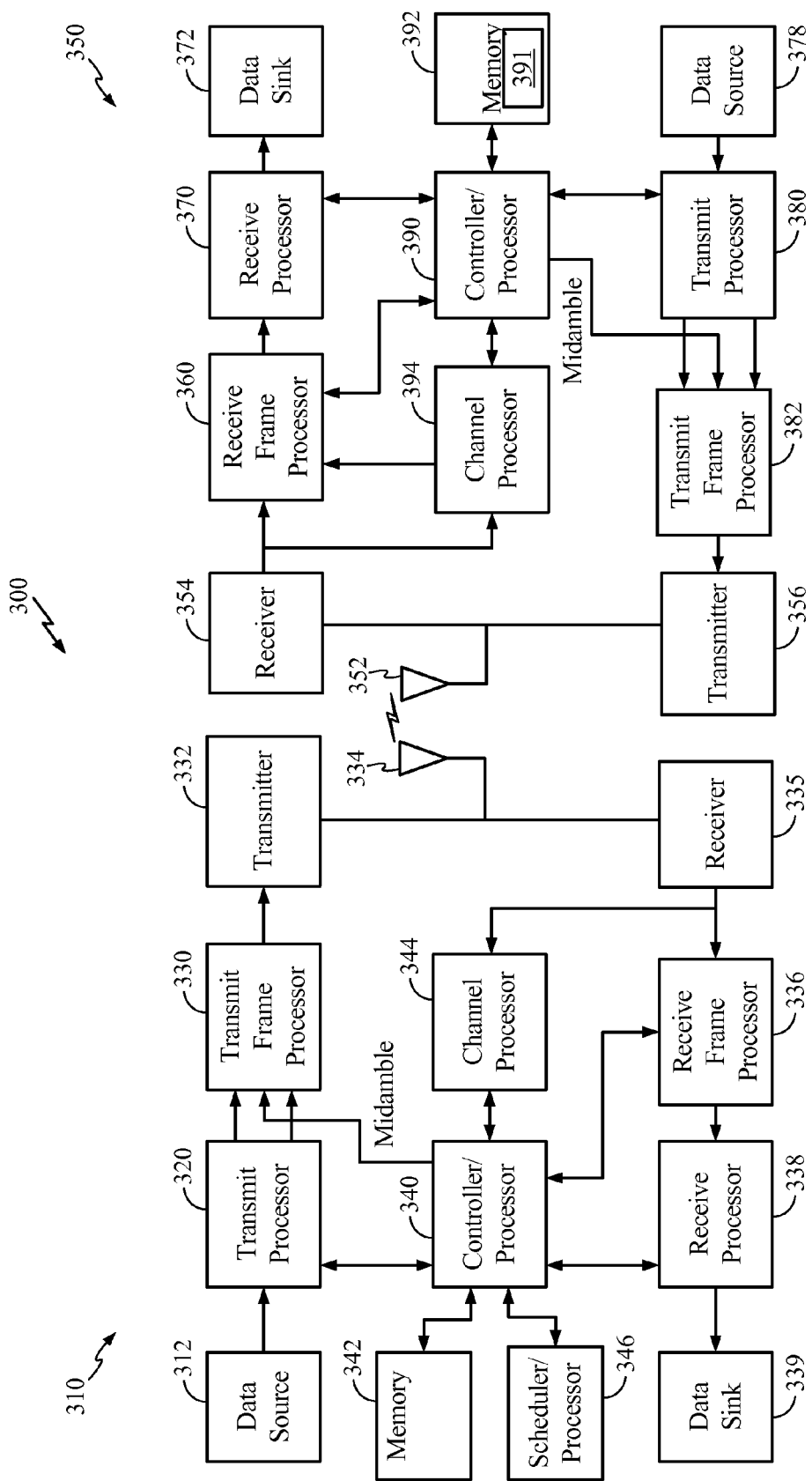
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a simultaneous acquisition module 391 which, when executed by the controller/processor 390, configures the UE 350 for dual mode operation for simultaneous acquisition. A scheduler/processor 346 at the node B 310 may be used to allocate resources to the UEs and schedule downlink and/or uplink transmissions for the UEs.

Certain mobile equipment may be configured to allow for operation on multiple wireless communication networks. For example, a UE may be capable of operating either on a TD-SCDMA network or on a TDD-LTE (Time Division Duplexed Long Term Evolution) network. Certain situations may direct the UE to communicate on one particular available network. For example, a multi-mode UE capable of communicating on either TD-SCDMA or on TDD-LTE may wish to connect to TDD-LTE for data service and to TD-SCDMA for voice service. There may be certain benefits to such arrangements. For example, TD-SCDMA offers both packet-switched (PS) data service and circuit-switched (CS) voice service whereas an early deployed TDD-LTE network may only offer packet-switched service, though at potentially higher data rates than TD-SCDMA. In such a scenario the TDD-LTE network may offer voice calls by using voice over internet protocol (VoIP) communications such as an IMS (IP (Internet Protocol) Multimedia Subsystem). If, however, the performance of TDD-LTE voice service is not satisfactory, a UE may desire to connect to a TDD-LTE network for data connections (such as web browsing or other activities) and may wish to connect to a TD-SCDMA network for voice call operation.

Figure 4:
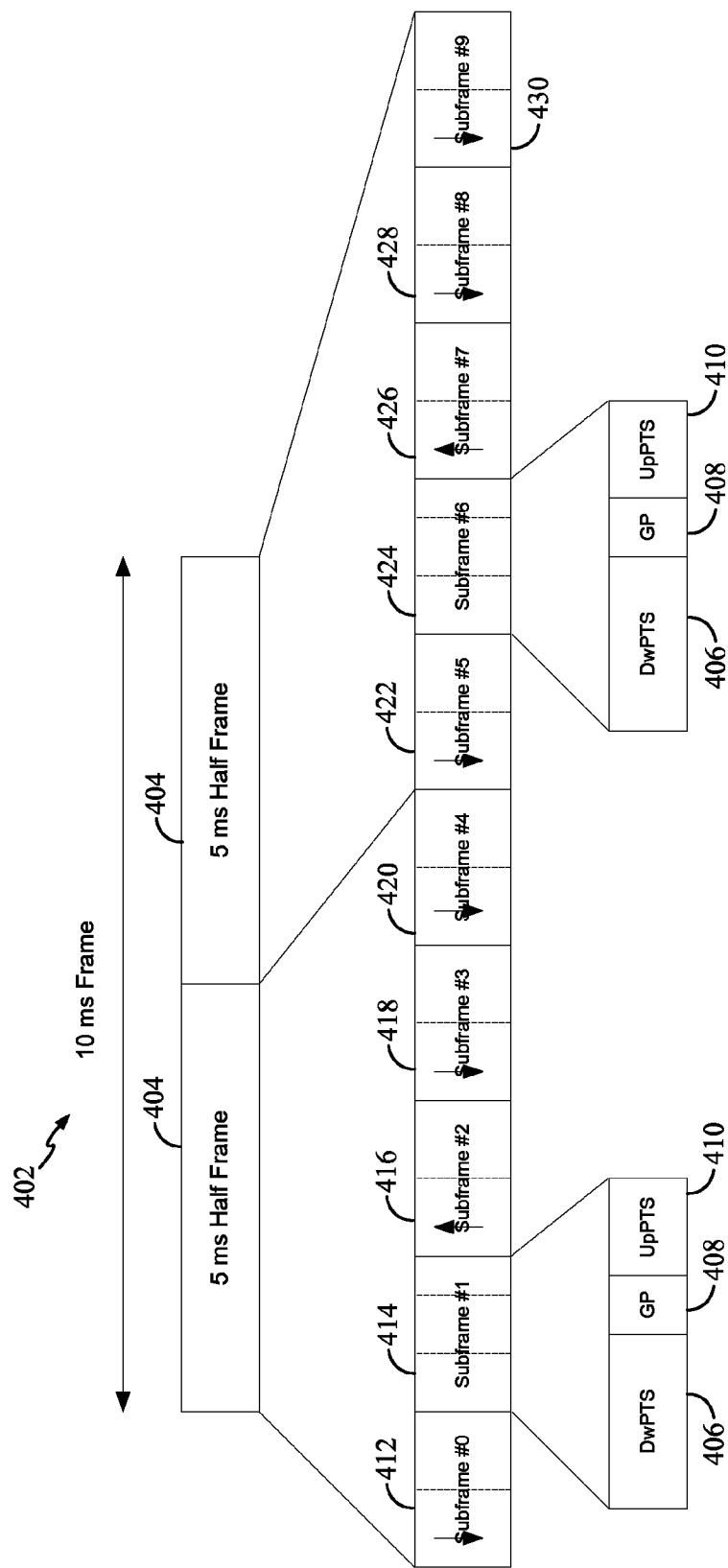
FIG. 4 is a block diagram conceptually illustrating an example of a frame structure in a telecommunications system.

FIG. 4 shows a frame structure for a TDD-LTE carrier. The TDD-LTE carrier, as illustrated, has a frame 402 that is 10 ms in length. Each radio frame has 307200 Ts, where T is the basic time unit of TDD-LTE. Each frame has two 5 ms half frames 404, and each of the half frames 404 includes five time subframes, giving each individual frame ten subframes, shown as subframe #0 through subframe #9 (412-430). Each subframe can be either a downlink subframe (D), uplink subframe (U), or special subframe (S). Downlink subframes and uplink subframes can be divided into two slots, each of 0.5 ms. A special subframe may be divided into DwPTS (Downlink Pilot Timeslot), UpPTS (Uplink Pilot Timeslot), and gap period. Depending on configuration, the duration of DwPTS, UpPTS, and the gap period can vary.

As illustrated in FIG. 4, subframe #1 414 and subframe #6 424 are special subframes each with a DwPTS 406, gap period 408, and UpPTS 410. Subframes #0, 3, 4, 5, 8, and 9 (412, 418, 420, 422, 428, and 430) are downlink subframes and subframes #2 and 7 (416 and 426) are uplink subframes. This uplink-downlink configuration corresponds to TDD-LTE frame configuration 2. The following table shows the possible uplink-downlink configurations in TDD-LTE:

call in circuit-switched (CS) operation, a procedure called a circuit-switched fallback (CSFB) is executed to handover the UE from being connected to the TDD-LTE network to being connected to the TD-SCDMA network. Presently, such circuit-switched fallback operations execute as illustrated in FIG. 5.

Figure 5:
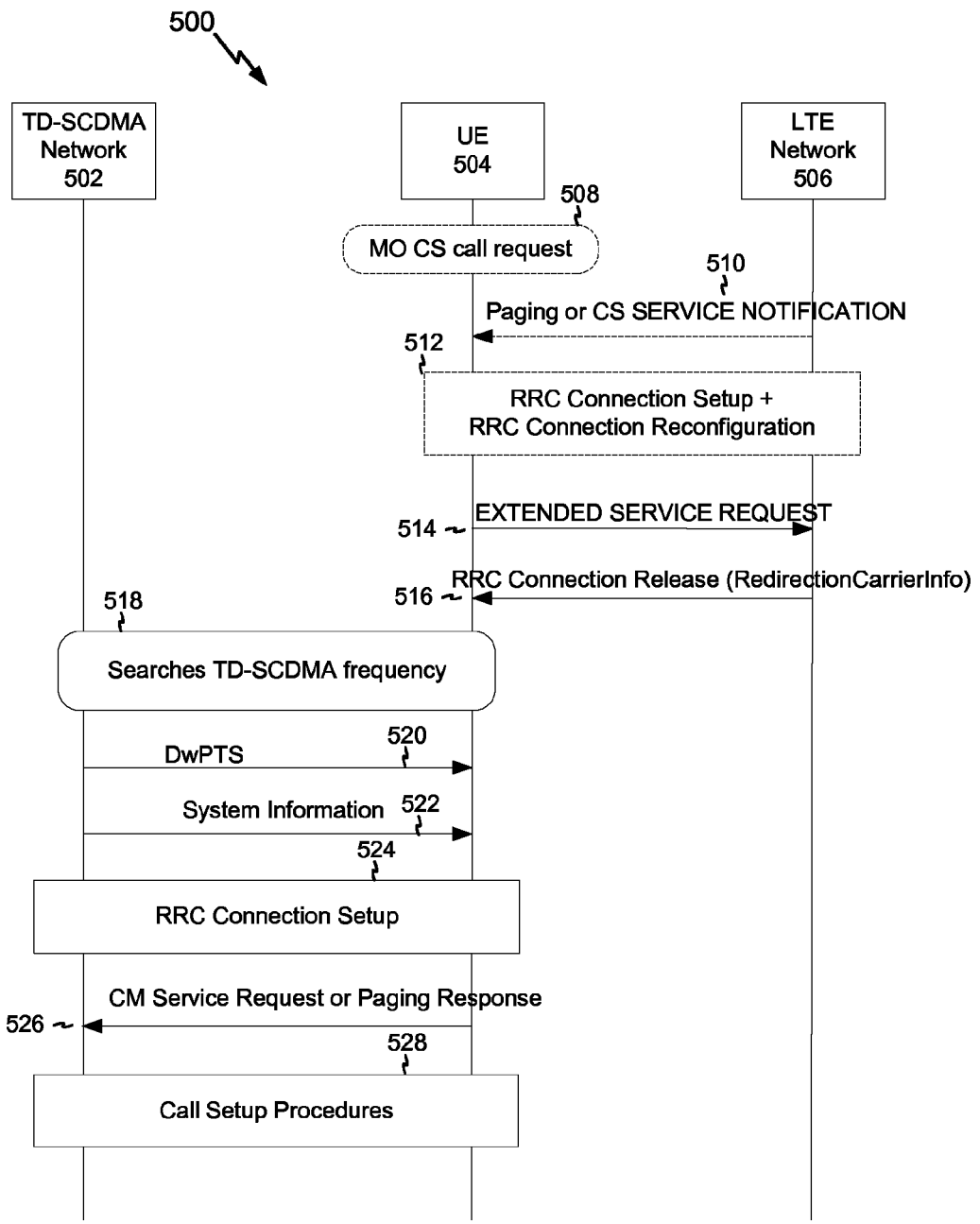
FIG. 5 is a call flow diagram illustrating a circuit-switched fallback call flow occurring with a UE configured according to one aspect of the present disclosure.

FIG. 5 shows a call flow 500, where a UE 504 can connect to a TD-SCDMA network 502 and a TDD-LTE network 506 for performing circuit-switched fallback. A UE 504 wishing to switch from a TDD-LTE network 506 to a TD-SCDMA network 502 for a voice call may either be idle or in active communication with the LTE network (i.e., web browsing or otherwise in a data connection) when the desire for a voice call arises (either by receiving or initiating a voice call). If the circuit-switched (CS) voice call request is originated by the UE (called a Mobile Originated (MO) call) a call request is generated as shown in block 508. The call request may result from a user initiated action, such as making a call request. For calls directed to the UE (called Mobile Terminated (MT) calls), the UE may receive a paging request (if the UE is in idle mode) or a circuit-switched service notification (if the UE is in connected mode) as shown in block 510. The paging message may indicate that the core network domain is operating in a circuit-switched mode.

If the UE 504 is idle the UE may perform steps to connect to the TDD-LTE network for purposes of eventually switching to the TD-SCDMA network. A radio resource control (RRC) connection setup procedure and RRC connection reconfiguration (shown in block 512) are performed to establish signaling and data connections between the UE 504 and the LTE network 506. Next the UE 504 sends an Extended Service Request 514 to the LTE network 506. The Extended Service Request 514 will include a request for the LTE network 506 to switch the UE 504 to the TD-SCDMA network 502 for voice service. The LTE network 506 then releases the connection with the UE 504 through a RRC connection release communication 516 to the UE 504. The connection release 516 may instruct the UE 504 to redirect to an indicated carrier frequency of the TD-SCDMA network 502. Several carrier frequencies may be indicated giving the UE 504 several potential frequencies. The UE 504 then either tunes to an indicated frequency or searches for an available TD-SCDMA signal/frequency as shown in block 518. The UE 504 may choose a frequency with a good connection/signal strength. The UE 504 then acquires the downlink pilot time slot (DwPTS) information, as shown in communication 520, and the system information of the TD-SCDMA network cell, as shown in communication 522. TD-SCDMA system information is sent on the P-CCPCH (Primary Common Control Physical Channel) during time slot 0. The UE 504 then performs the RRC connection setup in the TD-SCDMA network

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

If, as described above, a UE wishes to switch from a TDD-LTE network to a TD-SCDMA network to establish a voice 502, as shown in block 524. As shown in communication 526, the UE 504 then sends a connection management (CM) Service Request (if the call is mobile originated) or a Paging Response message (if the call is mobile terminated) to the TD-SCDMA network 502 in order to start voice call set up procedures 528.

The procedure shown in FIG. 5 may take several seconds, resulting in delays to proper call operation. Voice call setup is a time sensitive operation and the delays in the existing procedure are undesirable.

Offered is an improved UE architecture to allow for an improved circuit-switched fallback procedure.

FIG. 6A is a block diagram illustrating an exemplary dual mode UE 600 for implementing one aspect of the present disclosure. Signals from and to any base station are received and transmitted by the UE 600 through an antenna 602. The UE 600 may have independent RF chain hardware which enables parallel communications with two different networks. In one communication chain the UE 600 has transmit (TX) and receive (RX) capabilities, as indicated in component 604. For the other the UE 600 may have receive capabilities, as indicated in component 606. Communications may be processed by a processor such as the TD-SCDMA and TDD-LTE baseband hardware/protocol processor 608. With the components shown in FIG. 6A a UE 600 may be able to simultaneously transmit or receive with one network while receiving data from the other network.

FIG. 6B is also a block diagram illustrating another exemplary dual mode UE 601 for implementing one aspect of the present disclosure. The dual mode UE 601 receives and transmits signals using an antenna 602. In contrast to the dual mode UE 600 shown in FIG. 6A, for each network the UE 601 has transmit and receive capabilities for both networks, rather than having transmit and receive capability for one network but only receive capability with the other. In one communication chain the UE 601 has transmit and receive capabilities, as indicated in component 604. In the other communication chain the UE 601 also has transmit and receive capabilities, as indicated in component 610. Communications may be processed by a processor such as the TD-SCDMA and TDD-LTE baseband hardware/protocol processor 608. With the components shown in FIG. 6B a UE 601 may be able to simultaneously transmit or receive with one network while also transmitting or receiving with the other network.

A simultaneous acquisition module 609 may be included within the TD-SCDMA and TDD-LTE baseband hardware/protocol processor 608. The simultaneous acquisition module 609 can be hardware, software, or any combination of the two. High level functionality of the simultaneous acquisition module 609 is now described with respect to FIG. 7. More detailed operation is described with respect to FIG. 8.

Figure 7:
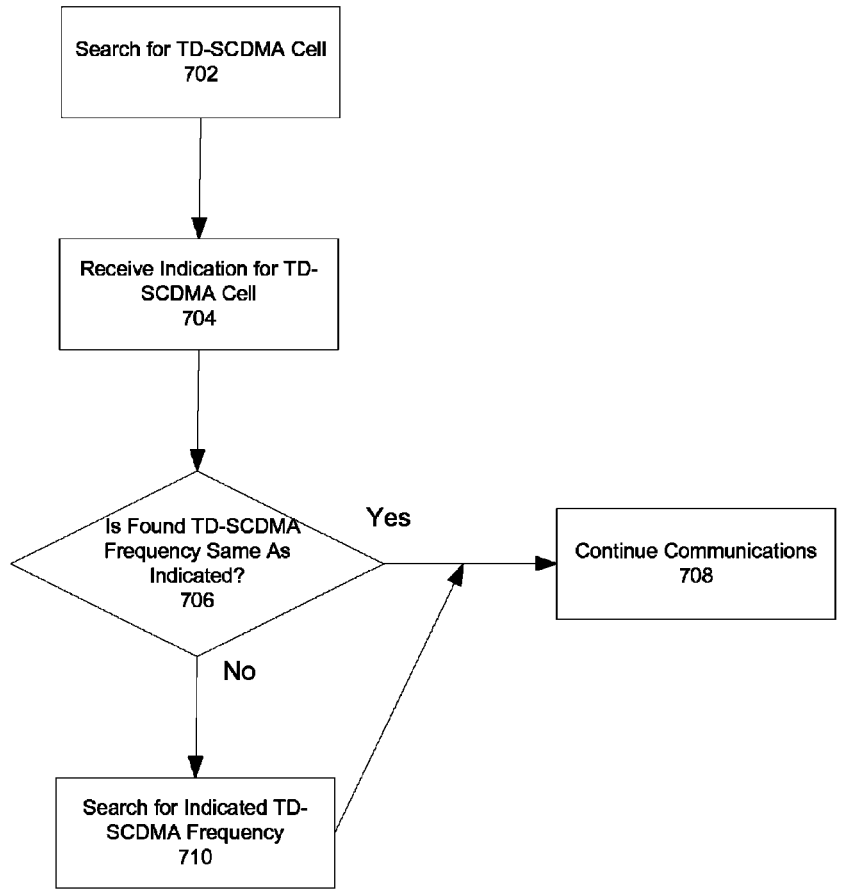
FIG. 7 is a flow diagram illustrating operation of the simultaneous acquisition module according to one aspect of the present disclosure.

As shown in block 702 of FIG. 7, the simultaneous acquisition module 609 searches for TD-SCDMA cells. In parallel the simultaneous acquisition module 609 receives an indication for a TD-SCDMA frequency from the TDD-LTE network, as shown in block 704. When the indicated TD-SCDMA frequency is received, the simultaneous acquisition module 609 compares the indicated TD-SCDMA frequency with the TD-SCDMA frequency independently found by the simultaneous acquisition module 609, as shown in block 706. If the frequencies match, communications may continue as configured, as shown in block 708. If the frequencies do not match, the simultaneous acquisition module 609 controls the UE to search for the indicated TD-SCDMA frequency, as shown in block 710. Communications then proceed, as shown in block 708.

Figure 8:
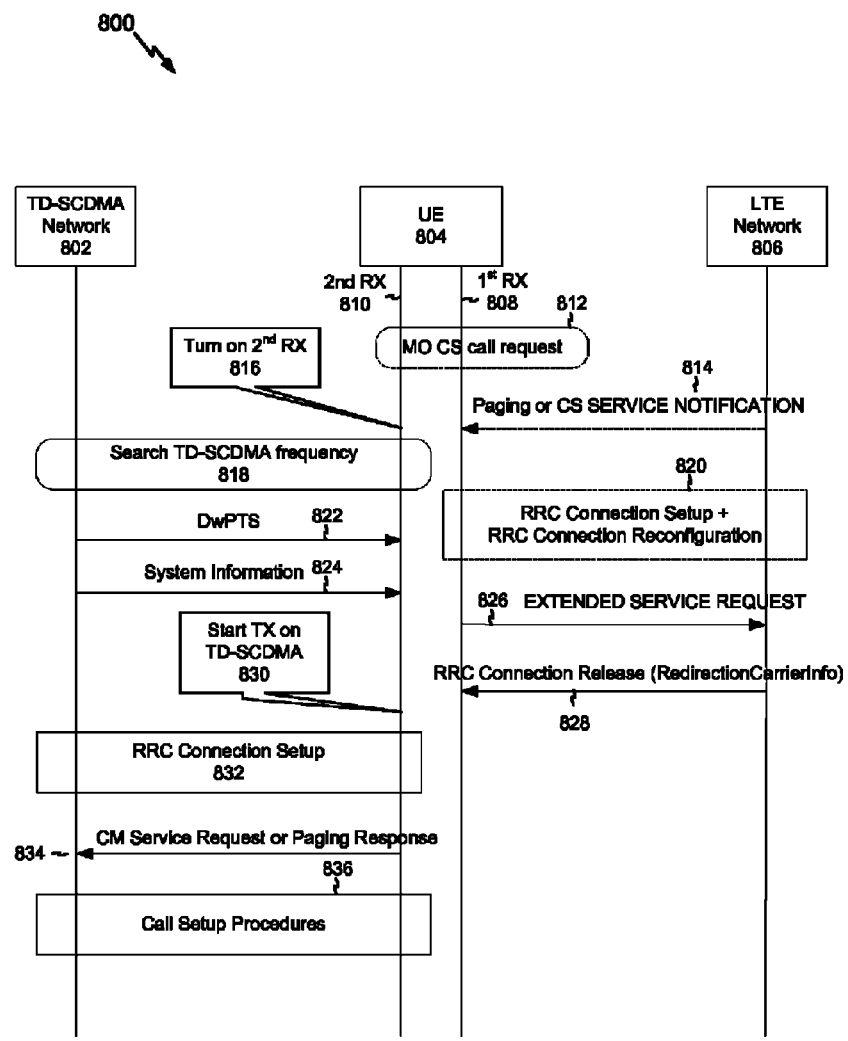
FIG. 8 is a call flow diagram illustrating a circuit-switched fallback call flow occurring with a UE configured according to one aspect of the present disclosure.

FIG. 8 shows a call flow employing an improved circuit-switched fallback procedure 800 according to one aspect of the present disclosure. A UE 804 employs two receive (RX) chains, which may use the hardware described above in FIGS. 6A and 6B. The first receive chain 808 communicates with the TDD-LTE network 806. The second receive chain 810 communicates with the TD-SCDMA network 802. In one aspect the first and second receive chains 808 and 810 correspond to the receive chains 604, 606, and 610 shown in FIGS. 6A-B.

The second receive chain 810 may be activated to allow the UE to simultaneously receive on both the TDD-LTE network 806 and the TD-SCDMA network 802 once the circuit-switched voice call is triggered. At time 816, the UE 804 may activate the second receive chain 810 following a local mobile originated circuit-switched voice call request at time 812. The UE 804 may also activate the second receive chain 810 when the UE 804 (in idle mode) receives a paging message from the TDD-LTE network 806 with a core network domain indicating circuit-switched operation, as shown at time 814. Or the UE 804 may activate the second receive chain 810 when the UE 804 (in connected mode) receives a circuit-switched service notification message from the TDD-LTE network 806, as shown at time 814. In certain aspects the UE 804 may only activate the second chain/parallel hardware for operation during a circuit-switched fallback procedure in order to conserve power.

While the UE 804 is communicating with the TDD-LTE network 806, the UE 804 uses the neighbor information broadcast in System Information from the TDD-LTE network 806 to search for neighboring TD-SCDMA cells on one or more frequencies, as shown at time 818. In particular, SIB6 (System Information Block Type 6) from the TDD-LTE network can indicate the neighbor TD-SCDMA frequency. In this manner the UE 804 gets a head start on searching for potential TD-SCDMA cells without having to wait for an indication from the TDD-LTE network 806 for which specific TD-SCDMA cell to acquire. The UE 804 then acquires the TD-SCDMA cell signals including the downlink pilot time slot (DwPTS) as shown at time 822 and System Information as shown at time 824. The second receive chain 810 may perform the above procedures concurrently with the first transmit/receive chain 808 operations. In one aspect, the second receive chain 810 operates concurrently with the first receive chain 808 performing RRC connection setup and RRC connection reconfiguration (as shown in block 820). In a second aspect, the second receive chain 810 operates concurrently with the first receive chain 808 sending the extended service request at time 826. In a third aspect, the second receive chain 810 operates concurrently with the first receive chain 808 receiving an RRC connection release at time 828. In other words, a TD-SCDMA cell search is initiated concurrently with LTE communications on the first receive chain 808 to obtain information relating to a circuit switched fall back.

When the UE 804 receives the RRC connection release message at time 828 from the TDD-LTE network 806, the message may indicate one or more redirected frequencies. There is some risk that the redirected frequency may not be the same as what the second receive chain 810 has been searching for. The UE 804 may take steps to verify that it has properly acquired the TD-SCDMA network 802 as indicated by the TDD-LTE network 806. If the UE 804 has acquired the TD-SCDMA network 802 on one of the indicated redirected frequencies, then the UE 804 may continue with the remaining circuit-switched fallback procedure. If the UE 804 has not acquired the TD-SCDMA network 802 on one of the indicated redirected frequencies, then the UE 804 may reacquire the TD-SCDMA network 802 using one of the indicated redirected frequencies.

If the UE 804 continues with the circuit-switched fallback procedure, the UE 804 starts transmission on the TD-SCDMA network 802, at time 830. The UE 804 and TD-SCDMA network 802 perform RRC connection setup at time 832. At time 834, the UE 804 then sends a connection management (CM) Service Request (if the call is mobile originated) or a Paging Response message (if the call is mobile terminated) to the TD-SCDMA network 802 in order to start voice call set up procedures at time 836.

The proposed circuit-switched fallback procedure, employing an improved UE hardware architecture, allows for certain connection setup procedures to occur in parallel, such as the UE pre-acquiring the TD-SCDMA cell. The parallel operations thus speeds up the circuit-switched fallback procedure and reduce existing delays in executing circuit-switched fallback from TDD-LTE to TD-SCDMA networks.

In one configuration, the apparatus, for example the UE 350, for wireless communication includes means for communicating with a first radio access network to obtain information relating to a circuit switched fall back to a second radio access network and means for initiating communications with the second radio access network during the communicating. In one aspect, the aforementioned means may be the antennas 352 or 602, the transmit/receive hardware 604 or 610, the receive hardware 606, the protocol processor 608, the receiver 354, the channel processor 394, the receive frame processor 360, the receive processor 370, the transmitter 356, the transmit frame processor 382, the transmit processor 380, the controller/processor 390, the memory 392, and the simultaneous acquisition module 391 configured to perform the functions recited by the aforementioned means. In another aspect, the aforementioned means may be a module or any apparatus configured to perform the functions recited by the aforementioned means.

Figure 9:
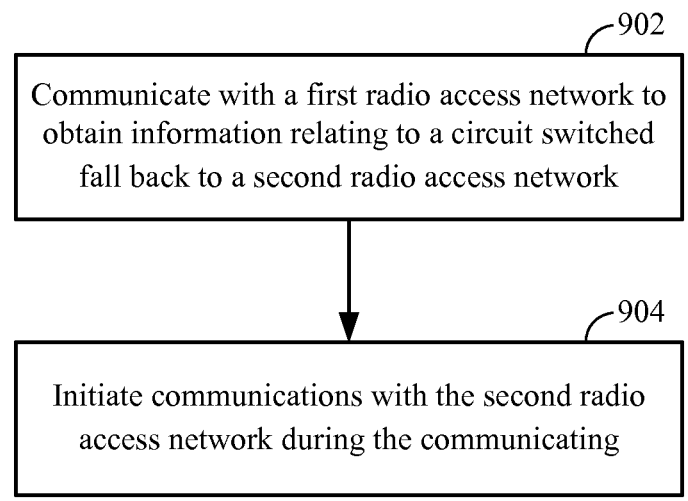
FIG. 9 is a functional block diagram illustrating example blocks executed to implement one aspect of the present disclosure.

As shown in FIG. 9 a UE may communicate with a first radio access network to obtain information relating to a circuit switched fall back to a second radio access network, as shown in block 902. The UE may also initiate communications with the second radio access network during the communicating, as shown in block 904.

Figure 10:
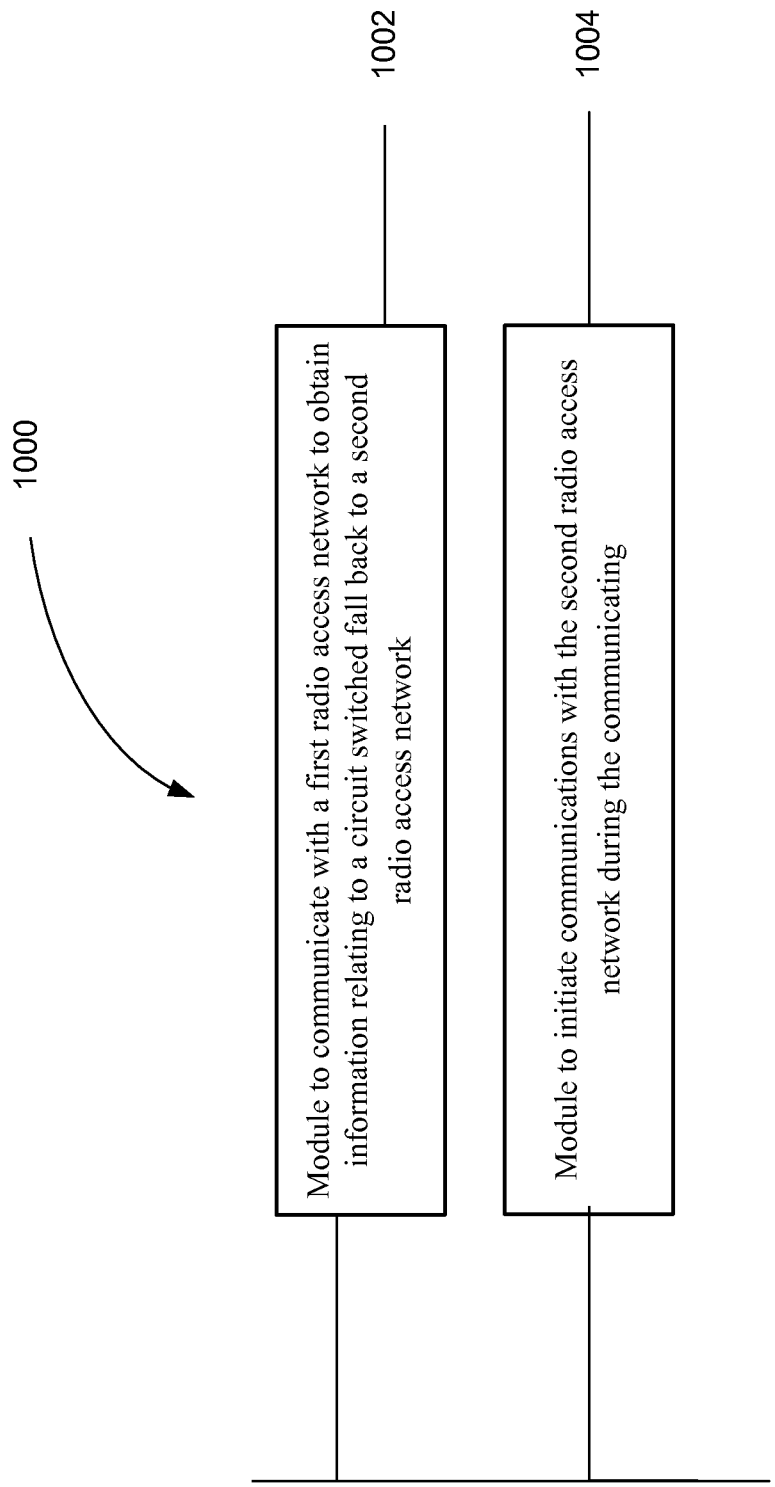
FIG. 10 is a block diagram illustrating components to implement one aspect of the present disclosure.

FIG. 10 shows a design of an apparatus 1000 for a UE, such as the UE 350 of FIG. 3. The apparatus 1000 includes a module 1002 to communicate with a first radio access network to obtain information relating to a circuit switched fall back to a second radio access network. The apparatus also includes a module 1004 to initiate communications with the second radio access network during the communicating. The modules in FIG. 10 may be processors, electronics devices, hardware devices, electronics components, logical circuits, memories, software codes, firmware codes, etc., or any combination thereof Several aspects of a telecommunications system has been presented with reference to TD-SCDMA and TDD-LTE systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing FDD Long Term Evolution (LTE), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication by a user equipment, comprising:
   communicating, at a first time, on a call with a first radio access network, the call using a first receiver chain of the user equipment;
   concurrently with the call with the first radio access network, and at the first time, attempting first communications with a second radio access network using a second receiver chain of the user equipment and a first frequency;
   receiving, at a second time after the first time, from the first radio access network during the call, information relating to circuit switched fall back to the second radio access network, the information comprising a second frequency for communicating with the second radio access network;
   comparing the first frequency with the second frequency; and
   in response to the first frequency being different from the second frequency:
      terminating the attempted first communications, and
      attempting, at a third time after the second time, second communications with the second radio access network using the second receiver chain and the second frequency.

2. The method of claim 1 in which the first radio access network comprises a time division duplexed-Long Term Evolution (TDD-LTE) network and the second radio access network comprises a time division-synchronous code division multiple access (TD-SCDMA) network.

3. The method of claim 1 in which the call with the first radio access network is packet-switched and communications with the second radio access network are circuit-switched.

4. The method of claim 1 in which the first frequency is received in a broadcast system information block 6 (SIB6) format.

5. A user equipment (UE) configured for wireless communication, the user equipment comprising:
   means for communicating, at a first time, on a call with a first radio access network, the call using a first receiver chain of the user equipment;
   means for concurrently with the call with the first radio access network, and at the first time, attempting first communications with a second radio access network using a second receiver chain of the user equipment and a first frequency;
   means for receiving, at a second time after the first time, from the first radio access network during the call, information relating to circuit switched fall back to the second radio access network, the information comprising a second frequency for communicating with the second radio access network;
   means for comparing the first frequency with the second frequency; and
   means for, in response to the first frequency being different from the second frequency:
      terminating the attempted first communications, and
      attempting, at a third time after the second time, second communications with the second radio access network using the second receiver chain and the second frequency.

6. The user equipment of claim 5 in which the first frequency is received in a broadcast system information block 6 (SIB6) format.

7. A computer program product in a user equipment, comprising:
   a non-transitory computer-readable medium having program code recorded thereon, the program code comprising:
      program code to communicate, at a first time, on a call with a first radio access network, the call using a first receiver chain of the user equipment;
      program code to attempt, concurrently with the call with the first radio access network, and at the first time, first communications with a second radio access network using a second receiver chain of the user equipment and a first frequency;
      program code to receive, at a second time after the first time, from the first radio access network during the call, information relating to circuit switched fall back to the second radio access network, the information comprising a second frequency for communicating with the second radio access network;
      program code to compare the first frequency with the second frequency; and
      program code to, in response to the first frequency being different from the second frequency:
         terminate the attempted first communications, and
         attempt, at a third time after the second time, second communications with the second radio access network using the second receiver chain and the second frequency.

8. The computer program product of claim 7 in which the first frequency is received in a broadcast system information block 6 (SIB6) format.

9. A user equipment (UE) configured for wireless communication, comprising:
   at least one processor; and
   a memory coupled to said at least one processor,
   wherein said at least one processor is configured:
      to communicate, at a first time, on a call with a first radio access network, the call using a first receiver chain of the user equipment;
      to attempt, concurrently with the call with the first radio access network, and at the first time, first communications with a second radio access network using a second receiver chain of the user equipment and a first frequency;
      to receive, at a second time after the first time, from the first radio access network during the call, information relating to circuit switched fall back to the second radio access network, the information comprising a second frequency for communicating with the second radio access network;
to compare the first frequency with the second frequency; and
in response to the first frequency being different from the second frequency:
to terminate the attempted first communications, and
to attempt, at a third time after the second time, second communications with the second radio access network using the second receiver chain and the second frequency.

10. The user equipment of claim 9 in which the first radio access network comprises a time division duplexed-Long Term Evolution (TDD-LTE) network and the second radio access network comprises a time division-synchronous code division multiple access (TD-SCDMA) network.

11. The user equipment of claim 9 in which the call with the first radio access network is packet-switched and communications with the second radio access network are circuit-switched.

12. The user equipment of claim 9 in which the first frequency is received in a broadcast system information block 6 (SIB6) format.

\* \* \* \* \*